April 25, 1944.  J. A. COXE ET AL  2,347,173
FISHING REEL
Filed Oct. 9, 1939  2 Sheets-Sheet 1

Inventors:
Joseph A. Coxe and
Richard P. McMahon
By: Freeman, Sweet, Albrecht & Weidman
Attys.

April 25, 1944.   J. A. COXE ET AL   2,347,173
FISHING REEL
Filed Oct. 9, 1939   2 Sheets-Sheet 2
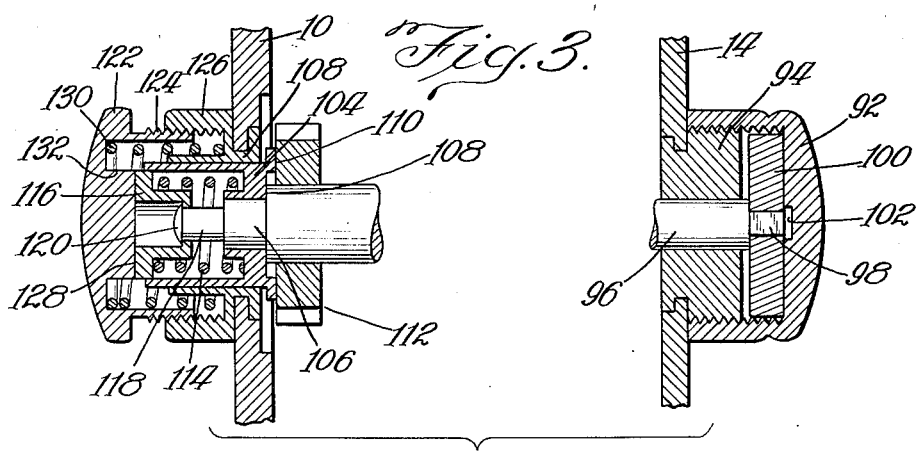
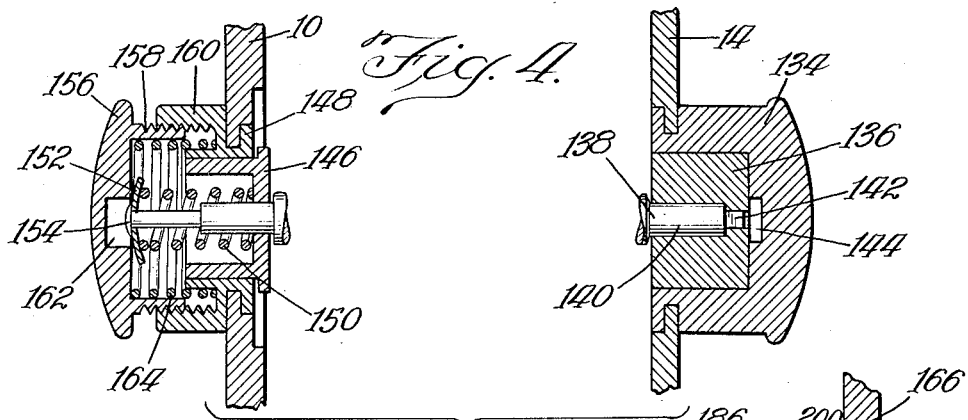
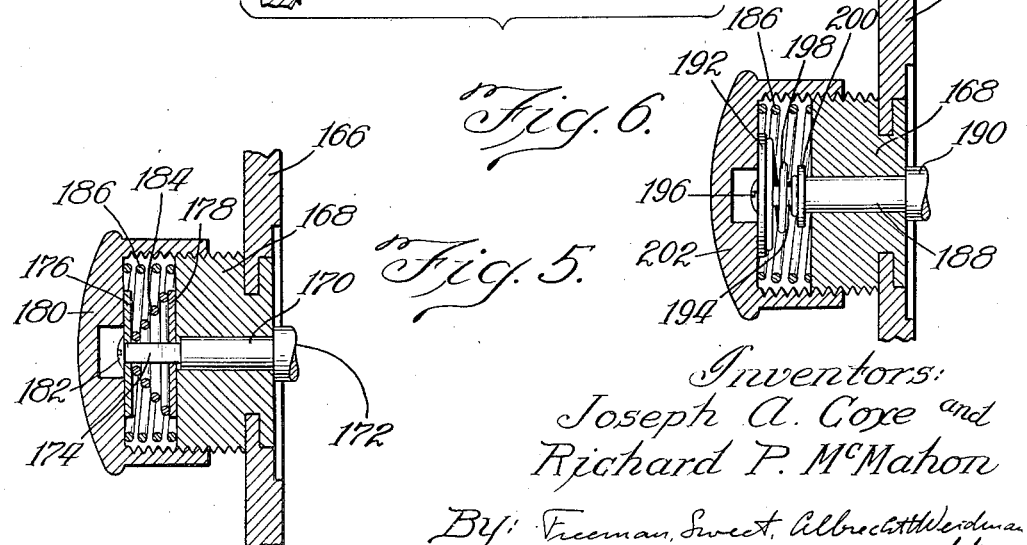
Inventors:
Joseph A. Coxe and
Richard P. McMahon Patented Apr. 25, 1944

2,347,173

UNITED STATES PATENT OFFICE 2,347,173

FISHING REEL

Joseph A. Coxe, Los Angeles, Calif., and Richard P. McMahon, Bronson, Mich., assignors to Bronson Reel Company, Bronson, Mich., a corporation of Michigan Application October 9, 1939, Serial No. 298,586

10 Claims. (Cl. 242—84.5)

Our invention relates to fishing reels, and includes among its objects and advantages a simplified and more durable construction for securing precise and accurate adjustment of the braking or damping of the rotation of the spool.

In the accompanying drawings:

Figure 3 is a similar section of a modified construction in which enlarged friction surfaces are available at both ends of the shaft;

Figure 4 is a similar section with large bearings at both shaft ends and a friction surface at the head end only;

Figure 5 is a similar section showing a simplified end bearing construction with two brake members; and Figure 6 is a section similar to Figure 5 employing only a single brake member.

Figure 1:
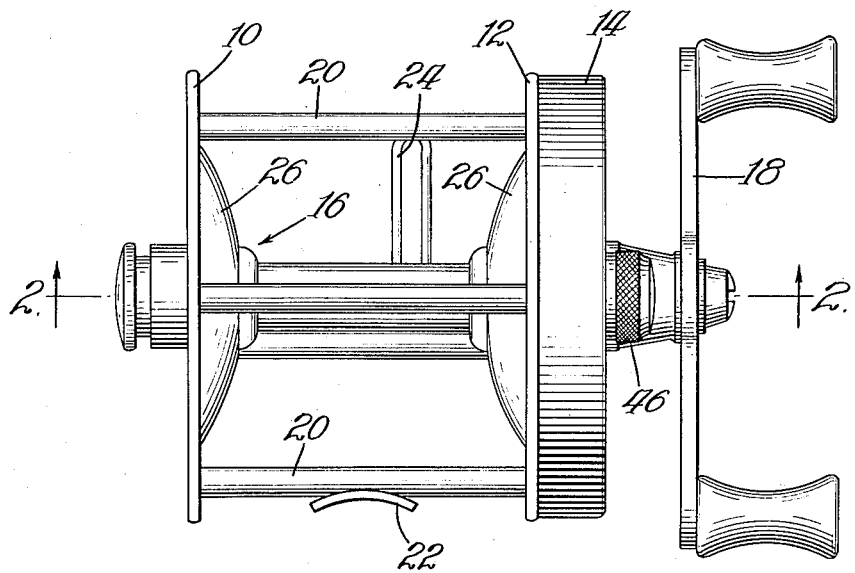
Figure 1 is a side elevation of a conventional reel indicating the application thereto of a drag according to the invention.

In the embodiment of the invention selected for illustration we have indicated a conventional reel comprising a tail plate 10, a head plate or ring 12, and a head cap 14, which head cap houses the customary gearing for driving the spool 16 by means of rotating the crank 18. There is also indicated the conventional pillars 20 for completing the frame; the conventional rod seat 22, and the conventional line-guiding loop 24, which may be actuated by any of the level winding mechanisms common in the art, and not illustrated in detail herein.

In the use of such a reel for casting purposes, during the cast, while the lure is traveling rapidly away from the angler and the spool is turning rapidly to pay out line, the commonest difficulty encountered, even by experienced anglers, is that some irregularity of movement will cause the spool to turn momentarily a little faster than the line is withdrawn from it. When this happens, the outermost turns of line on the spool expand radially in all directions by centrifugal force, and whip around until they lap over each other and tangle. This abruptly arrests the motion of the spool and snubs the lure and the tangle may be a very troublesome one for the angler to untangle. Such a tangle is commonly referred to as back-lash.

To prevent back-lash, an experienced angler always carries his thumb near the mass of line on the spool where any initial ballooning of the outer turns of the line will bring them up against his thumb, and thus develop a slight braking action. And as a rule, an experienced angler keeps his thumb rubbing a little against the thread throughout most of the cast to guard against the inception of any ballooning that might cause a back-lash.

This thumbing of the reel abrades the skin on the tip of the user's thumb, and unless practiced very skillfully, it soon develops a soreness that interferes with casting.

Various braking means have been employed to replace the thumbing action in whole or in part. The chief objections to most such brakes or drags is that they are not sufficiently sensitive, and a slight adjustment of them changes the friction by such a large amount that it is difficult for the angler to get the adjustment he wants. With manufacturing processes carried on with a very high degree of precision and accuracy, it is possible to employ a braking member engaging one of the end bells 26 of the spool 16 and still secure satisfactory adjustment. But unless the work is extremely accurate and precise, the operation of such devices is not only abrupt but even irregular in its action.

According to the invention we provide friction means acting close to the axis of the spool, where a relatively large axial force generates a relatively small resistance to turning movement.

Figure 2:
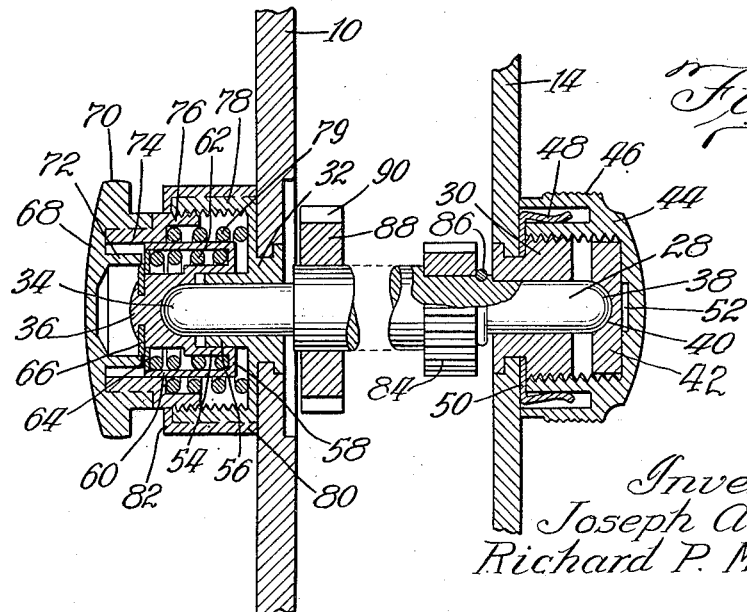
Figure 2 is a fragmentary section through the spool shaft as on line 2—2 of Figure 1.

Referring first to the embodiment of Figure 2, the conventional spool shaft 28 is provided with a fixed cylindrical bearing 30 at the head end, which bearing is integrally assembled in the head cap 14. At the tail end the shaft 28 extends beyond the bearing 32 and has a spherical end 34 fitted accurately in a hollow cup 36.

At the head end a similar spherical shaft end 38 fits in a spherical cavity 40 in a disc 42. The disc 42 is held in place by the cap 44 threaded onto the bearing 30 and knurled as at 46 to facilitate turning it and preferably also frictionally held against rotation by resilient spring arms 48 turned up from the periphery of a ring 50 integrally assembled by clamping it between the head cap 14 and an opposing shoulder on the bearing 30. The end of the cap 44 has a flat surface for abutment with the outer face of the disc 42, and coaxial with the shaft it has a small countersink 52. We have found that without such a countersink 52 the lubricant in the device tends to build up something resembling a suction action between the surfaces of the disc 42 and the cap 44 and render the friction irregular and spasmodic. In a device provided with such a countersink 52 the action is smooth and regular.

It will be apparent that an axial thrust on the cup 36 will generate friction between the spherical ends 34 and 38 and the part against which they abut, and that this friction is close to the axis of the reel so that it is not necessary to use either extremely light hair springs or parts machined with extreme precision to secure accurate and precise adjustment.

We have provided hermetically sealed adjustable means for pressing the cup 36 against the shaft with a predetermined force adjustable by the user. The cup 36 includes a sleeve portion 54 encircling a tubular extension 56 forming part of the bearing 32; a radially extending flange 58 and a reversely extending sleeve 60. These parts 54, 58, and 60 define an annular cavity receiving the coil spring 62, which abuts the flange 58 at one end and the thrust washer 64 at the other end. The thrust washer 64 is held in assembled relation by the retaining washer 66 suitably riveted to the cup 36. The pressure capsule comprising the cup 36, spring 62 and retaining parts, is rotatable with respect to the bearing sleeve 56 and with respect to the shaft end 34. To compress the spring 62 and apply an axial thrust to the cup 36 we have provided the outer adjustment cap 68 having a peripheral knurled flange 70, and an annular sleeve 72, the inner end of which may abut the thrust washer 64 to apply a predetermined thrust, or may be withdrawn from such contact, in which case the spool turns freely without any damping action. The cap 70 is integrally assembled, as by making the parts a press fit, with a sleeve 74 having an enlarged extension 76 which is externally threaded and engages the internal threads of a still larger sleeve 78 integral with the bearing 32. The shoulder formed between the sleeve portions 74 and 76 provides abutment for a holding spring 79 which is at all times under a sufficient compression load to prevent inadvertent or accidental rotation of the cap 70. To seal the complete assemblage permanently, we provide a sealing sleeve 80 which is a pressed fit on the sleeve 78 and has an inwardly directed flange 82 smaller than the threaded portion of the sleeve 76 and this prevents unscrewing and removal of the cap 70.

In Figure 2 the parts are illustrated with the thrust washer 64 engaging the holding washer 66 and the adjacent end of the sleeve 72 barely out of contact with the washer 64. In this condition of adjustment the spool is undamped, but the user can turn the cap 70 to push the thrust washer 64 to the right as far as he wishes and thus apply a variable but accurately controllable axial thrust to generate friction on the parts.

The shaft 28 is provided at the head end with the usual drive pinion 84 held in place by the snap ring retainer 86; and at the tail end with the conventional click wheel 88 having teeth 90.

Referring now to Figure 3, the performance of the device there illustrated is generally analogous to that of Figure 2 but much higher friction values can be obtained, and when the user adjusts the device to eliminate the friction there is still more bearing friction than in the construction of Figure 2. At the head end the cap 92 is directly threaded on the bearing member 94 and the shaft 96 has a squared end portion 98 fitting in a corresponding opening in the plate 100 which abuts the cap 92 except for the countersink 102. This compels the plate 100 to turn with the shaft so that a large friction area is provided at the head end. At the tail end an intermediate bearing member 104 is a pressed fit on the shaft portion 106 of the shaft 96 and turns in the outer bearing member 108. An extension 110 of the bearing member 104 opposes the bearing 108 to limit end play when the spool is running free. In this figure the conventional click wheel 112 corresponds to wheel 88 in Figure 2.

The pressure capsule housing the drag spring 114 is completed by the cup 116 slidable on the shaft extension 118 and limited in its movement to the left by the rivet head 120. The cap 122 carries the threaded sleeve 124 threaded inside the outer sleeve 126 integral with the bearing 108. The center of the cap is provided with a contact surface at 128 to abut the adjacent rim of the cup 116 and compress the spring 114. The holding spring 130 abuts the main bearing 108 at one end, and the bottom of a suitable guiding groove 132 in the cap 122 at the other end.

Referring now to the embodiment of Figure 4, the head cap 14 carries a unitary bearing and cap 134 providing a rotatable socket for the bearing plug 136. The shaft 138 has a circular portion 140 received in the plug 136, and a reduced squared tip 142 resting in a square hole in the plug so that the plug turns with the shaft. The cap 134 is also provided with the axial countersink 144. At the tail end the cup 146 is pressed or keyed to the shaft to turn with it, and the operating bearing surface is between the cup 146 and the bearing 148. The drag spring 150 abuts the bottom of the cup 146 at one end, and at its other end engages the small retaining plate 152 held in the position of Figure 4 by the rivet head 154. The cap 156 has the sleeve 158 threaded into the outer sleeve 160, and is centrally bored at 162 to provide clearance for the rivet head 154, and held against axial turning by the holding spring 164. It will be apparent that adjustment of the cap 156 to move it to the right will cause it to engage the plate 152 and compress the spring 150.

Referring to Figure 5, the plate 166 may be either the tail plate or the head cap. The bearing 168 is integrally assembled therewith and supports and guides the bearing portion 170 of the shaft 172. In this construction an accurately adjustable friction may be developed without axial thrust on the shaft. The extension 174 is of square cross section, and the friction plates 176 and 178 turn with the shaft and abut against the inner surface of the cap 180 and the adjacent end surface of the bearing 168 respectively. The plate 176 is prevented from moving off the extension 174 by the screw head 182. The plates 176 and 178 are resiliently pressed away from each other by the drag spring 184, and the holding spring 186 prevents accidental displacement of the threaded connection between the cap 180 and the bearing 168.

In the embodiment of Figure 6 the plate 166 and bearing 168 may be identical with those in Figure 5, but the bearing portion 188 of the shaft 190 extends slightly beyond the end of the bearing 168. A single friction plate 192, which may be identical with the plate 176 of Figure 5 is restrained from leaving the squared shank 194 by the screw head 196, and pressed to the left by the drag spring 198 which, at its right end, abuts the small washer 200 which in turn abuts the end of the bearing portion 188. In such a construction it will be apparent that moving the cap 202 to the right will build up a friction between the cap 202 and the friction plate 192, and at the same time exert an axial thrust on the shaft, the other end of which may be equipped with friction connections according to any of Figures 2, 3, or 4.

Without further elaboration the foregoing will so fully explain our invention that others may, by applying knowledge current at the time of application, readily adapt the same for use under various conditions of service. It will, for instance, be obvious that many of the modifications shown lend themselves well to damping the spool movement hydraulically by filling the parts with relatively viscous lubricant.

We claim:

1. A fishing reel comprising, in combination: a frame; a spool journaled in said frame; a crank on the head end of said frame; said spool having end bells and a shaft projecting beyond said end bells at both ends; transmission at the head end of said frame for driving said spool from said crank; said crank being rotatable about an axis offset from said spool axis; a head end bearing in said frame for one end of said shaft; said crank including an arm extending out to swing around over said head end bearing when rotated; said spool shaft having a head end bearing portion of reduced diameter; said transmission including a pinion having a bore encasing the head end of said shaft and removable over said reduced head end bearing portion; thrust abutment means in said head end bearing including an abutment element of greater diameter than the bore of said pinion; said abutment element being housed in said head end bearing and having a spherical surface removably abutting a spherical surface at the outer end of said reduced bearing portion; one of said spherical surfaces being convex and the other concave; and manually adjustable drag means at the tail end of said shaft for imposing axial thrust on said shaft to generate friction in two axially separated places at opposite ends of said shaft; said drag means including an abutment member, and tensioning means for said member; a bearing for the tail end of said shaft; said tail end projecting axially beyond said bearing; said abutment member abutting said projecting end; said member and end having spherical abutment surfaces, one convex and one concave; said abutment member having contact surfaces also engaging said tail end bearing to guide said abutment member in rotation and axial movement; said abutment member including an annular chamber; a compression spring housed in said chamber, and an axially movable thrust washer defining the outer end of said chamber; said chamber having a shoulder limiting the outward movement of said thrust washer; said tensioning means including an externally accessible manual adjustment member threadedly connected with said frame for rotation about a prolongation of the spool axis, said manual adjustment member having an interior annular flange positioned to move into and out of engagement with said thrust washer as said adjustment member is turned, and when in engagement with said thrust washer to force said thrust washer toward said frame to the extent desired by the operator.

2. A fishing reel comprising, in combination: a frame; a spool journaled in said frame; said spool having end bells and a shaft projecting beyond said end bells at both ends; a crank on the head end of said frame; transmission at the head end of said frame for driving said spool from said crank; said crank being rotatable about an axis offset from said spool axis; a head end bearing in said frame for one end of said shaft; said crank including an arm extending out to swing around over said head end bearing when rotated; and manually adjustable drag means at the tail end of said shaft for imposing axial thrust on said shaft to generate friction; said drag means including a compression spring, an externally accessible manual adjustment member threadedly connected with said frame for rotation about a prolongation of the spool axis to move into and out of engagement with said spring as said adjustment member is turned, and means for limiting the expansion of said spring to permit said adjustment member to move completely out of contact with said spring and leave the spool free, with said spring still under material tension.

3. A fishing reel comprising, in combination: a frame; a spool journaled in said frame; said spool having end bells and a shaft projecting beyond said end bells at both ends; a crank on the head end of said frame; transmission at the head end of said frame for driving said spool from said crank; said crank being rotatable about an axis offset from said spool axis; a head end bearing in said frame for one end of said shaft; said crank including an arm extending out to swing around over said head end bearing when rotated; said spool shaft having a head end bearing portion of reduced diameter; said transmission including a pinion having a bore encasing the head end of said shaft and removable over said reduced head end bearing portion; thrust abutment means in said head end bearing including an abutment element of greater diameter than the bore of said pinion; said abutment element being housed in said head end bearing and connected to said shaft to rotate therewith; and manually adjustable drag means at the tail end of said shaft for imposing axial thrust on said shaft to generate friction; said drag means including an abutment member, and tensioning means for said member; a bearing for the tail end of said shaft; said tail end projecting axially beyond said bearing; said abutment member abutting said projecting end; said member and end having spherical abutment surfaces, one convex and one concave; said abutment member having contact surfaces also engaging said tail end bearing to guide said abutment member in rotation and axial movement; said abutment member including an annular chamber, a compression spring housed in said chamber, and an axially movable thrust washer defining the outer end of said chamber; said chamber having a shoulder limiting the outward movement of said thrust washer; said tensioning means including an externally accessible manual adjustment member threadedly connected with said frame for rotation about a prolongation of the spool axis, said manual adjustment member having an interior annular flange positioned to move into and out of engagement with said thrust washer as said adjustment member is turned, and when in engagement with said thrust washer to force said thrust washer toward said frame to the extent desired by the operator.

4. A fishing reel comprising, in combination: a frame; a spool having a shaft; bearings in said frame for said spool shaft; one of said bearings including a housing, and an intermediate member rotatably supported in said housing and in turn supporting said shaft; said housing and intermediate member having opposed plane abutment faces normal to the shaft axis; one of said faces having a closed central recess through which said axis passes.

5. A fishing reel comprising, in combination: a frame; a spool having a shaft; bearings in said frame for said spool shaft; one of said bearings including a housing, and an intermediate member rotatably supported in said housing and in turn supporting said shaft; said housing and intermediate member having opposed plane abutment faces normal to the shaft axis; said faces having annular contact portions, and spaced central portions defining a central recess through which said axis passes.

6. A fishing reel comprising, in combination: a frame; a spool having a shaft; bearings in said frame for said spool shaft; one of said bearings including a housing, and an intermediate member rotatably supported in said housing and in turn supporting said shaft; said housing and intermediate member having opposed plane abutment faces normal to the shaft axis; said faces having annular contact portions, and central portions separated to define a closed central recess through which said axis passes.

7. A fishing reel comprising, in combination: a frame including a head plate and a tail plate; a spool having a shaft journaled in said plates; a housing carried by the head plate and receiving the adjacent end of said spool shaft; a thrust member in said housing; said thrust member having the first abutment face facing toward said spool and engaging a cooperating abutment face on said shaft; said thrust member having a second abutment face facing away from said spool and engaging a cooperating abutment face on said housing; said thrust member being free to rotate with respect to said housing or said shaft or both; and manually adjustable resilient means at the opposite end of said spool shaft for imposing a desired amount of thrust on said thrust member.

8. A fishing reel according to claim 7 in which the abutting faces of said housing and thrust member are plane and normal to the axis of rotation, and in which one of said faces is cut away adjacent the axis of rotation to leave surface for frictional engagement only over an annular area spaced from the axis of rotation.

9. A fishing reel comprising, in combination: a frame; a spool having a shaft; bearings in said frame for said spool shaft; one of said bearings including a housing, and an intermediate member rotatably supported in said housing and in turn supporting said shaft; said housing and intermediate member having opposed plane abutment faces normal to the shaft axis; said faces having annular contact portions, and central portions separated to define a closed central recess through which said axis passes, said recess being located entirely beyond the end of said shaft.

10. A fishing reel comprising, in combination: a frame; a spool having a shaft; bearings in said frame for said spool shaft; one of said bearings including a housing, and an intermediate member rotatably supported in said housing and in turn supporting said shaft; said housing and intermediate member having opposed plane abutment faces normal to the shaft axis; one of said faces having a closed central recess through which said axis passes; said member and shaft having interengaging surfaces permitting free rotation of said shaft with respect to said member.

JOSEPH A. COXE.
RICHARD P. McMAHON.